(12) United States Patent
Maddux et al.

(10) Patent No.: US 9,787,560 B2
(45) Date of Patent: Oct. 10, 2017

(54) EFFECTIVE SERVICE NODE TRAFFIC ROUTING

(71) Applicant: Microsoft Technology Licensing, LLC, Redmond, WA (US)

(72) Inventors: Denver Maddux, Brisbane (AU); Darrin Veit, Sammamish, WA (US); Stefan K Gordon, Redmond, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 208 days.

(21) Appl. No.: 14/731,304

(22) Filed: Jun. 4, 2015

(65) Prior Publication Data

US 2016/0359706 A1    Dec. 8, 2016

(51) Int. Cl.
| | | |
|---|---|---|
| *G06F 15/173* | (2006.01) | |
| *H04L 12/26* | (2006.01) | |
| *H04L 29/08* | (2006.01) | |
| *H04L 29/14* | (2006.01) | |

(52) U.S. Cl.
CPC ............ *H04L 43/08* (2013.01); *H04L 43/065* (2013.01); *H04L 67/101* (2013.01); *H04L 67/1008* (2013.01); *H04L 67/322* (2013.01); *H04L 67/06* (2013.01); *H04L 69/40* (2013.01)

(58) Field of Classification Search
CPC ... H04L 43/08; H04L 43/065; H04L 67/1008; H04L 67/101; H04L 67/322; H04L 67/06; H04L 69/40
USPC ......................................................... 709/224
See application file for complete search history.

(56) References Cited

U.S. PATENT DOCUMENTS

| | | |
|---|---|---|
| 6,003,030 A | 12/1999 | Kenner et al. |
| 7,346,676 B1 | 3/2008 | Swildens |
| 7,386,318 B2 | 6/2008 | Moon |
| 7,555,542 B1 | 6/2009 | Ayers et al. |
| 7,886,023 B1 | 2/2011 | Johnson |
| 7,908,080 B2 | 3/2011 | Rowley |
| 8,050,193 B2 | 11/2011 | Accetta |
| 8,239,530 B2 | 8/2012 | Sundaram |
| 8,423,667 B2 | 4/2013 | Richardson |

(Continued)

OTHER PUBLICATIONS

"International Search Report and Written Opinion Issued in PCT Application No. PCT/US2016/034912", dated Aug. 8, 2016, 16 Pages.

(Continued)

*Primary Examiner* — Melvin H Pollack
(74) *Attorney, Agent, or Firm* — Schwabe, Williamson & Wyatt P.C.

(57) ABSTRACT

The present describes a traffic routing system to establish a connection with a primary service location, receive a list of service location peers from the primary service location, execute a performance test of the primary service location and each of the service location peers, identify a best performing service location based at least in part on the performance test, and update a database with results of the performance test of the primary service location and each of the service location peers. The traffic routing system may use business rules to expand the criteria to identify the best performing service location. The business rules may include weights that prioritize certain performance characteristics of corresponding service locations including bandwidth cost, energy cost, or idle capacity.

18 Claims, 9 Drawing Sheets

(56) References Cited

U.S. PATENT DOCUMENTS

| | | |
|---|---|---|
| 8,498,303 B2 | 7/2013 | Satterlee |
| 8,631,129 B2 | 1/2014 | Baumback |
| 8,745,128 B2 | 6/2014 | Kazerani |
| 8,843,630 B1 | 9/2014 | Thomas |
| 9,253,065 B2 * | 2/2016 | Richardson |
| 9,264,508 B2 * | 2/2016 | Wolf ................... H04L 67/2842 |
| 9,270,944 B2 * | 2/2016 | Brooks ............. H04N 7/17318 |
| 9,325,805 B2 * | 4/2016 | Shattil ................... H04L 67/327 |
| 9,332,051 B2 * | 5/2016 | Brueck ................. H04L 65/607 |
| 9,357,247 B2 * | 5/2016 | Cronk ................... H04L 63/102 |
| 9,407,681 B1 * | 8/2016 | Richardson ............ H04L 67/02 |
| 9,432,452 B2 * | 8/2016 | Gibson ................. H04L 67/104 |
| 9,451,045 B2 * | 9/2016 | Newton ............... H04L 67/2852 |
| 9,549,038 B1 * | 1/2017 | Anne ................. H04L 67/2842 |
| 2003/0133410 A1 | 7/2003 | Kang |
| 2005/0044229 A1 | 2/2005 | Brown et al. |
| 2005/0071469 A1 | 3/2005 | McCollom |
| 2009/0234965 A1 | 9/2009 | Viveganandhan |
| 2009/0300161 A1 | 12/2009 | Pruitt |
| 2009/0323544 A1 | 12/2009 | Gaddis |
| 2011/0055328 A1 | 3/2011 | Lahr et al. |
| 2012/0087368 A1 | 4/2012 | Kunarathnam |
| 2013/0336167 A1 | 12/2013 | Vadlakonda |
| 2015/0334153 A1 * | 11/2015 | Koster ................ H04L 65/4069 709/219 |
| 2015/0379557 A1 * | 12/2015 | Liu ..................... G06Q 30/0244 705/14.43 |
| 2016/0125200 A1 * | 5/2016 | York ................... G06F 21/6254 726/1 |
| 2016/0127244 A1 * | 5/2016 | Gonzalez Brenes ... H04L 47/41 709/217 |
| 2016/0218963 A1 * | 7/2016 | Nauck ..................... H04L 45/70 |
| 2016/0255140 A1 * | 9/2016 | Shattil ................... H04L 67/101 |
| 2016/0337426 A1 * | 11/2016 | Shribman ........... H04L 65/4084 |
| 2016/0337474 A1 * | 11/2016 | Rao ..................... H04L 41/0806 |
| 2016/0381127 A1 * | 12/2016 | Gibson ................. H04L 67/104 709/219 |

OTHER PUBLICATIONS

Saro Velrajan; "Application-Aware Routing in Software-Defined Networks"; Apr. 2013; Aricent White Paper; 5 pages.

"Second Written Opinion Received for PCT Application No. PCT/US2016/034912", dated Jan. 20, 2017, 7 Pages.

* cited by examiner

EFFECTIVE SERVICE NODE TRAFFIC ROUTING

TECHNICAL FIELD

The present disclosure relates to effective service node traffic routing.

BACKGROUND

Content distribution networks are distributed systems of computing devices deployed across a global communications network to distribute content. Content distribution networks may include servers, storage, and associated components that distribute content including web objects e.g., text, graphics, and scripts, downloadable objects, e.g., media files, software, and documents, applications, e.g., e-commerce and portals, live streaming media, on-demand media, and social networks. Content distribution networks may be deployed in many geographic locations often over multiple backbones. Content distribution networks may include any number of service nodes in any number of varying geographic locations depending on architecture. Content distribution networks may direct user requests for content to service nodes that are optimal in some manner, e.g., service nodes that may provide content with the fewest hops, service nodes with the least number of network seconds away from the requesting client device, or service nodes with the highest availability in terms of performance. When optimizing for cost, content distribution networks may chose service nodes that are least expensive. In many instances, content distribution networks may optimize service node selection for both performance and cost.

Often, clients are routed to their closest service node using inaccurate or incomplete information, which provides acceptable level of accuracy for latency tolerant applications. For very low latency applications, however, a more accurate means of routing clients to the closest service node is required.

BRIEF DRAWINGS DESCRIPTION

The present disclosure describes various embodiments that may be understood and fully appreciated in conjunction with the following drawings.

DETAILED DESCRIPTION

The present disclosure describes embodiments with reference to the drawing figures listed above. Persons of ordinary skill in the art will appreciate that the description and figures illustrate rather than limit the disclosure and that, in general, the figures are not drawn to scale for clarity of presentation. Such skilled persons will also realize that many more embodiments are possible by applying the inventive principles contained herein and that such embodiments fall within the scope of the disclosure which is not to be limited except by the claims.

Figure 1:
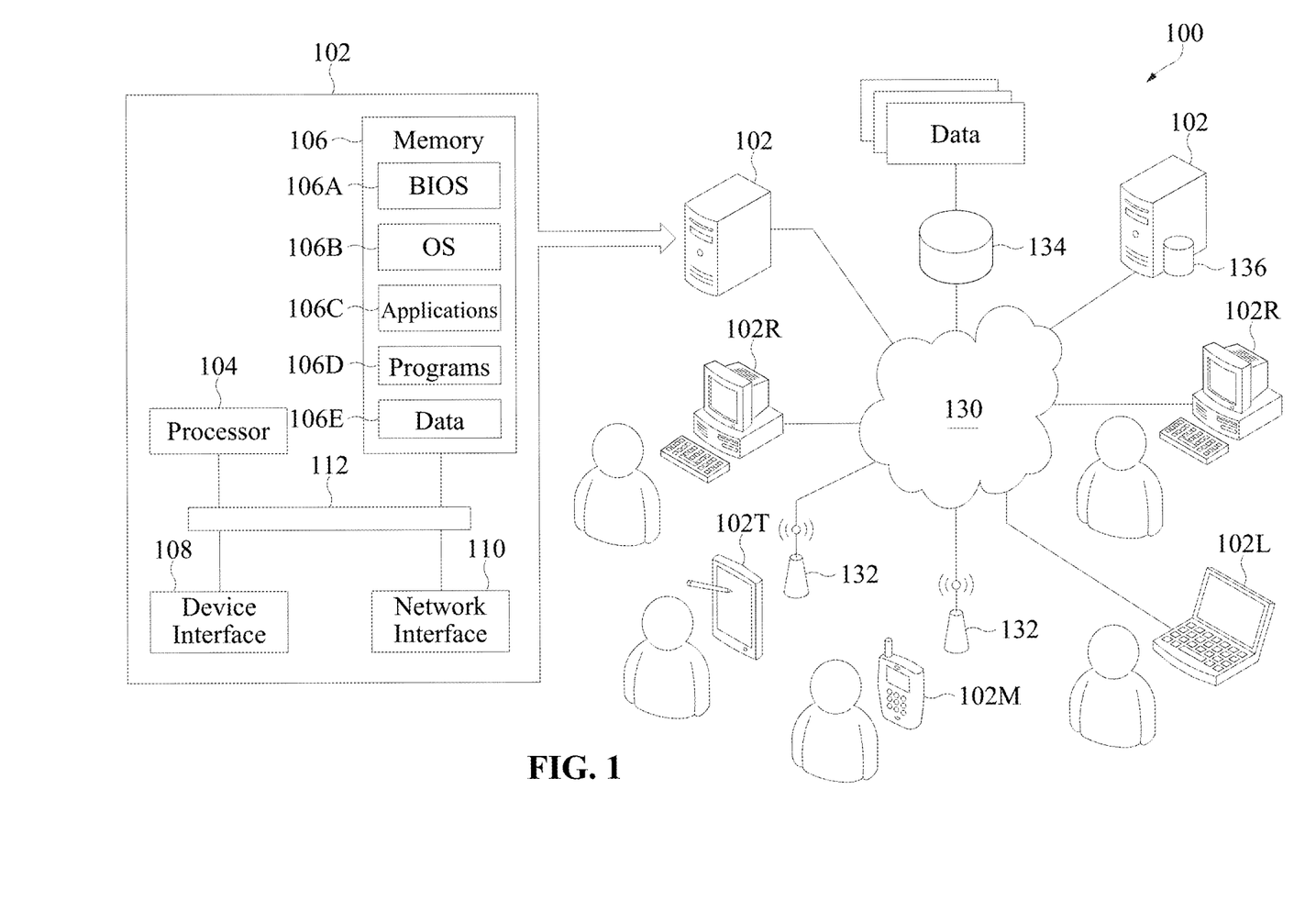
FIG. 1 diagrams an embodiment of a system according to the present disclosure.

FIG. 1 diagrams an embodiment of a system 100 according to the present disclosure. Referring to FIG. 1, system 100 includes a computing device 102 that may execute instructions defining components, objects, routines, programs, instructions, data structures, virtual machines, and the like that perform particular tasks or functions or that implement particular data types. Instructions may be stored in memory, e.g., system memory 106, remote memory 134, or external memory 136. Some or all of the programs may be instantiated at run time by one or more processors comprised in a processing unit, e.g., processing device 104. A person of ordinary skill in the art will recognize that many of the concepts associated with the exemplary embodiment of system 100 may be implemented as computer instructions, firmware, or software in any of a variety of computing architectures, e.g., computing device 102, to achieve a same or equivalent result.

Moreover, a person of ordinary skill in the art will recognize that the exemplary embodiment of system 100 may be implemented on other types of computing architectures, e.g., general purpose or personal computers, hand-held devices, mobile communication devices, gaming devices, music devices, photographic devices, multi-processor systems, microprocessor-based or programmable consumer electronics, minicomputers, mainframe computers, application specific integrated circuits, and like. For illustrative purposes only, system 100 is shown in FIG. 1 to include computing devices 102, geographically remote computing devices 102R, tablet computing device 102T, mobile computing device 102M, and laptop computing device 102L. A person of ordinary skill in the art may recognize that computing device 102 may be embodied in any of tablet computing device 102T, mobile computing device 102M, or laptop computing device 102L. Mobile computing device 102M may include mobile cellular devices, mobile gaming devices, mobile reader devices, mobile photographic devices, and the like.

A person of ordinary skill in the art will recognize that an exemplary embodiment of system 100 may be implemented in a distributed computing system in which various computing entities or devices, often geographically remote from one another, e.g., computing device 102 and remote computing device 102R, perform particular tasks or execute particular objects, components, routines, programs, instructions, data structures, and the like. For example, the exemplary embodiment of system 100 may be implemented in a server/client configuration connected via network 130 (e.g., computing device 102 may operate as a server and remote computing device 102R or tablet computing device 102T may operate as a client, all connected through network 130). In distributed computing systems, application programs may be stored in local memory 106, external memory 136, or remote memory 134. Local memory 106, external memory 136, or remote memory 134 may be any kind of memory, volatile or non-volatile, removable or non-removable, known to a person of ordinary skill in the art including random access memory (RAM), flash memory, read only memory (ROM), ferroelectric RAM, magnetic storage devices, optical discs, and the like.

Computing device 102 comprises processing device 104, memory 106, device interface 108, and network interface 110, which may all be interconnected through bus 112. The processing device 104 represents a single, central processing unit, or a plurality of processing units in a single or two or more computing devices 102, e.g., computing device 102 and remote computing device 102R. Local memory 106, as well as external memory 136 or remote memory 134, may be any type memory device known to a person of ordinary skill in the art including any combination of RAM, flash memory, ROM, ferroelectric RAM, magnetic storage devices, optical discs, and the like that is appropriate for the particular task. Local memory 106 may store a database, indexed or otherwise. Local memory 106 may store a basic input/output system (BIOS) 106A with routines executable by processing device 104 to transfer data, including data 106D, between the various elements of system 100. Local memory 106 also may store an operating system (OS) 106B executable by processing device 104 that, after being initially loaded by a boot program, manages other programs in the computing device 102. Memory 106 may store routines or programs executable by processing device 104, e.g., applications or programs 106C. Applications or programs 106C may make use of the OS 106B by making requests for services through a defined application program interface (API). Applications or programs 106C may be used to enable the generation or creation of any application program designed to perform a specific function directly for a user or, in some cases, for another application program. Examples of application programs include word processors, database programs, browsers, development tools, drawing, paint, and image editing programs, communication programs, tailored applications, and the like. Users may interact directly with computing device 102 through a user interface such as a command language or a user interface displayed on a monitor (not shown). Local memory 106 may be comprised in a processing unit, e.g., processing device 104.

Device interface 108 may be any one of several types of interfaces. Device interface 108 may operatively couple any of a variety of devices, e.g., hard disk drive, optical disk drive, magnetic disk drive, or the like, to the bus 112. Device interface 108 may represent either one interface or various distinct interfaces, each specially constructed to support the particular device that it interfaces to the bus 112. Device interface 108 may additionally interface input or output devices utilized by a user to provide direction to the computing device 102 and to receive information from the computing device 102. These input or output devices may include voice recognition devices, gesture recognition devices, touch recognition devices, keyboards, monitors, mice, pointing devices, speakers, stylus, microphone, joystick, game pad, satellite dish, printer, scanner, camera, video equipment, modem, monitor, and the like (not shown). Device interface 108 may be a serial interface, parallel port, game port, firewire port, universal serial bus, or the like.

A person of ordinary skill in the art will recognize that the system 100 may use any type of computer readable medium accessible by a computer, such as magnetic cassettes, flash memory cards, compact discs (CDs), digital video disks (DVDs), cartridges, RAM, ROM, flash memory, magnetic disc drives, optical disc drives, and the like. A computer readable medium as described herein includes any manner of computer program product, computer storage, machine readable storage, or the like.

Network interface 110 operatively couples the computing device 102 to one or more remote computing devices 102R, tablet computing devices 102T, mobile computing devices 102M, and laptop computing devices 102L, on a local, wide, or global area network 130. Computing devices 102R may be geographically remote from computing device 102. Remote computing device 102R may have the structure of computing device 102 and may operate as server, client, router, switch, peer device, network node, or other networked device and typically includes some or all of the elements of computing device 102. Computing device 102 may connect to network 130 through a network interface or adapter included in the interface 110. Computing device 102 may connect to network 130 through a modem or other communications device included in the network interface 110. Computing device 102 alternatively may connect to network 130 using a wireless device 132. The modem or communications device may establish communications to remote computing devices 102R through global communications network 130. A person of ordinary skill in the art will recognize that programs 106C might be stored remotely through such networked connections. Network 130 may be local, wide, global, or otherwise and may include wired or wireless connections employing electrical, optical, electromagnetic, acoustic, or other carriers as is known to a person of ordinary skill in the art.

The present disclosure may describe some portions of the exemplary system 100 using algorithms and symbolic representations of operations on data bits within a memory, e.g., memory 106. A person of ordinary skill in the art will understand these algorithms and symbolic representations as most effectively conveying the substance of their work to others of ordinary skill in the art. An algorithm is a self-consistent sequence leading to a desired result. The sequence requires physical manipulations of physical quantities. Usually, but not necessarily, these quantities take the form of electrical or magnetic signals capable of being stored, transferred, combined, compared, and otherwise manipulated. For simplicity, the present disclosure refers to these signals as bits, values, elements, symbols, characters, terms, numbers, or like. The terms are merely convenient labels. A person of skill in the art will recognize that terms such as computing, calculating, generating, loading, determining, displaying, or like refer to the actions and processes of a computing device, e.g., computing device 102. The computing device 102 may manipulate and transform data represented as physical electronic quantities within a memory into other data similarly represented as physical electronic quantities within the memory.

In an embodiment, system 100 may be a distributed network in which some computing devices 102 operate as servers, e.g., computing device 102, to provide content, services, or the like, through network 130 to other computing devices operating as clients, e.g., remote computing device 102R, laptop computing device 102L, tablet computing device 102T. In some circumstances, distributed networks use highly accurate traffic routing systems to route clients to their closest service nodes.

Figure 2A:
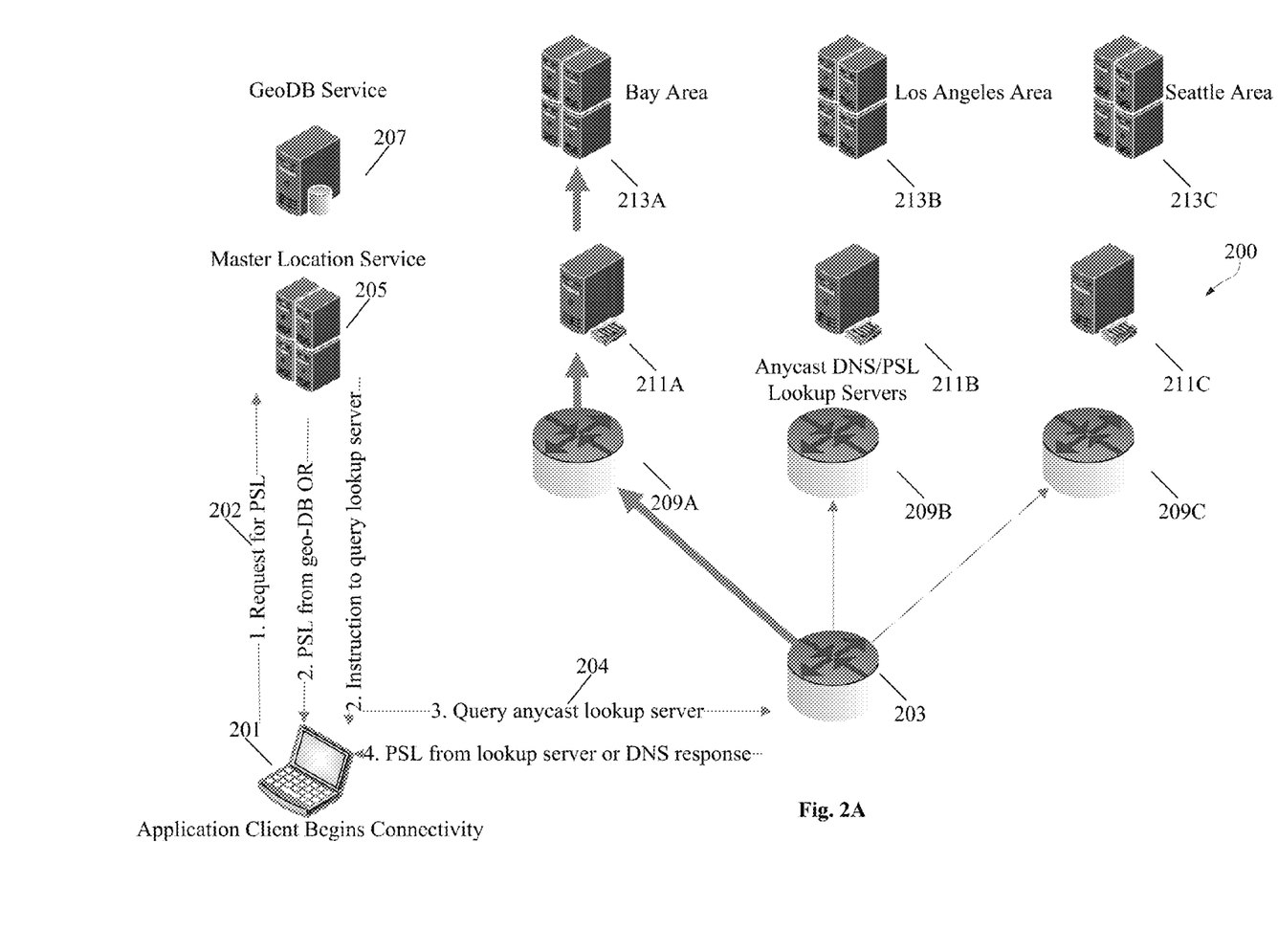
FIGS. 2A-2E diagram embodiments of a traffic routing method and system according to the present disclosure.

FIGS. 2A-2E diagram embodiments of a traffic routing method and system according to the present disclosure. Referring to FIGS. 1 and 2A, a client computing device 201 may establish a connection to a primary service location (PSL), e.g., PSL 213A, 213B, or 213C, in a network 200 to receive or stream content, media, services, and the like. To do so, client computing device 201 identifies a candidate primary service location that is most capable of providing the content, media, services, or the like in a high quality and reliable manner free of substantial packet loss or extraordinary delay that may adversely affect the user's experience.

In some circumstances, client computing device 201 may query a master location service 205 to identify a candidate primary service location, e.g., PSL 213A, 213B, or 213C, from which client computing device 201 may receive or stream content, media, services, or the like. Master location service 205 may, in turn, query a geolocation database 207 to automatically or otherwise identify a candidate primary service location. Master location service 205 may be any kind of computing device known to a person of ordinary skill art including, e.g., computing device 102. Similarly, geolocation database 207 may be any kind of database capable of indexing and storing data in any kind of memory known to a person of ordinary skill in the art. Geolocation database 207 may rely on databases of subnets and where those subnets are deployed geographically.

In an embodiment, client computing device 201 may provide an identification 202, e.g., an internet protocol (IP) address, media access control (MAC) address, radio frequency identification (RFID), hardware embedded article number, embedded software number (e.g., UUID, Exif/IPTC/XMP or modem steganography), invoice, WIFI positioning system or the like with the request for identification of a candidate primary service location to master location service 205. Identification 202 may include information such as country, region, city, postal or zip code, latitude, longitude, time zone, or the like. Master location service 205 may determine a physical location, e.g., Sacramento, of client computing device 201 based on identification 202. In an embodiment, master location service 205 may look up a candidate primary service location for client computing device 201 in geolocation database 207 based on identification 202. In an embodiment, geolocation database 207 may map IP address ranges to geographic locations and to service locations based on known routing characteristics. Master location service 205 may return an identification of a primary service location to client computing device 201. For example, master location service 205 may identify PSL 213A in the Bay Area to client computing device 201 as a candidate primary service location. Identification 202 of client computing device 201 may be compared to the geolocation database 207 to identify where the closest primary service location is located from a geographical perspective. A disadvantage of this manner of identification of a candidate primary service location is that the identified candidate service location will be the closest geographically but not necessarily the closest from a network route perspective.

In an embodiment, master location service 205 may instruct client computing 201 to query lookup server 203 for an identification of a candidate primary service location either because master location service 205 is unable to locate a suitable candidate primary service location or otherwise. Lookup server 203 may be a domain name service (DNS) or PSL server having some or all of the characteristics of any computing device known to a person of ordinary skill in the art, e.g., computing device 102.

Client computing device 201 may transmit a query 204 to lookup server 203 configured to look up or otherwise identify a candidate primary service location. Query 204 may in some circumstances be anycast from client computing device 201. Query 204 may be routed from client computing device 201 to a topologically nearest node in a group of nodes e.g., lookup server 203, servers 209A, 209B, 209C, 211A, 211B, or 211C, all identified by a same destination address. Anycast DNS or PSL lookup server 211A may return identification of PSL 213A to lookup server 203 and to client computing device 201 as a candidate primary service location.

In some circumstances, query 204 may be anycast to a PSL lookup server 203 across edge points of network 200. In some circumstances, query 204 may include an anycast IP address that allows the use of the same IP address for multiple locations and that allow the use of existing network routing tables to direct clients to their closest anycast IP location. PSL anycast to server 203 may thus ignore geographical data while focusing on how data is actually routed on network 200. PSL anycast to server 203 may also avoid misconfigured DNS settings on client computing device 201. A disadvantage is that the shortest path may not be the best path relative to congestion. Put differently, a primary service location may be ideal distance-wise but not best performing from a network congestion or capacity standpoint.

Query 204 may alternatively be anycast to a domain name service (DNS) lookup server 203 that relies on clients being configured with DNS server settings that are located relatively close to client computing device 201 in network 200, which may not be as accurate. For anycast DNS, we rely on client computing devices 201 in network 200 doing lookups from their Internet service provider (ISP) assigned servers 209A, 209B, or 209C that, in turn, contact anycast DNS servers 211A, 211B, or 211C for the DNS records being queried. DNS servers 211A, 211B, or 211C respond with an address, e.g., IP address, of the DNS server's closest primary service location, from a network perspective. A disadvantage of identifying a candidate primary service location in this manner is that client computing devices 201 that are configured to use DNS servers further from their location may be misrouted to suboptimal service locations. Anycast may be implemented using any of a variety of protocols known to a person of ordinary skill in the art including Border Gate Protocol (BGP).

Lookup server 203 may return or otherwise reply to client computing device 201 by identifying a candidate primary service location, e.g., PSL 213A, based at least in part on anycast query 204.

Figure 2B:
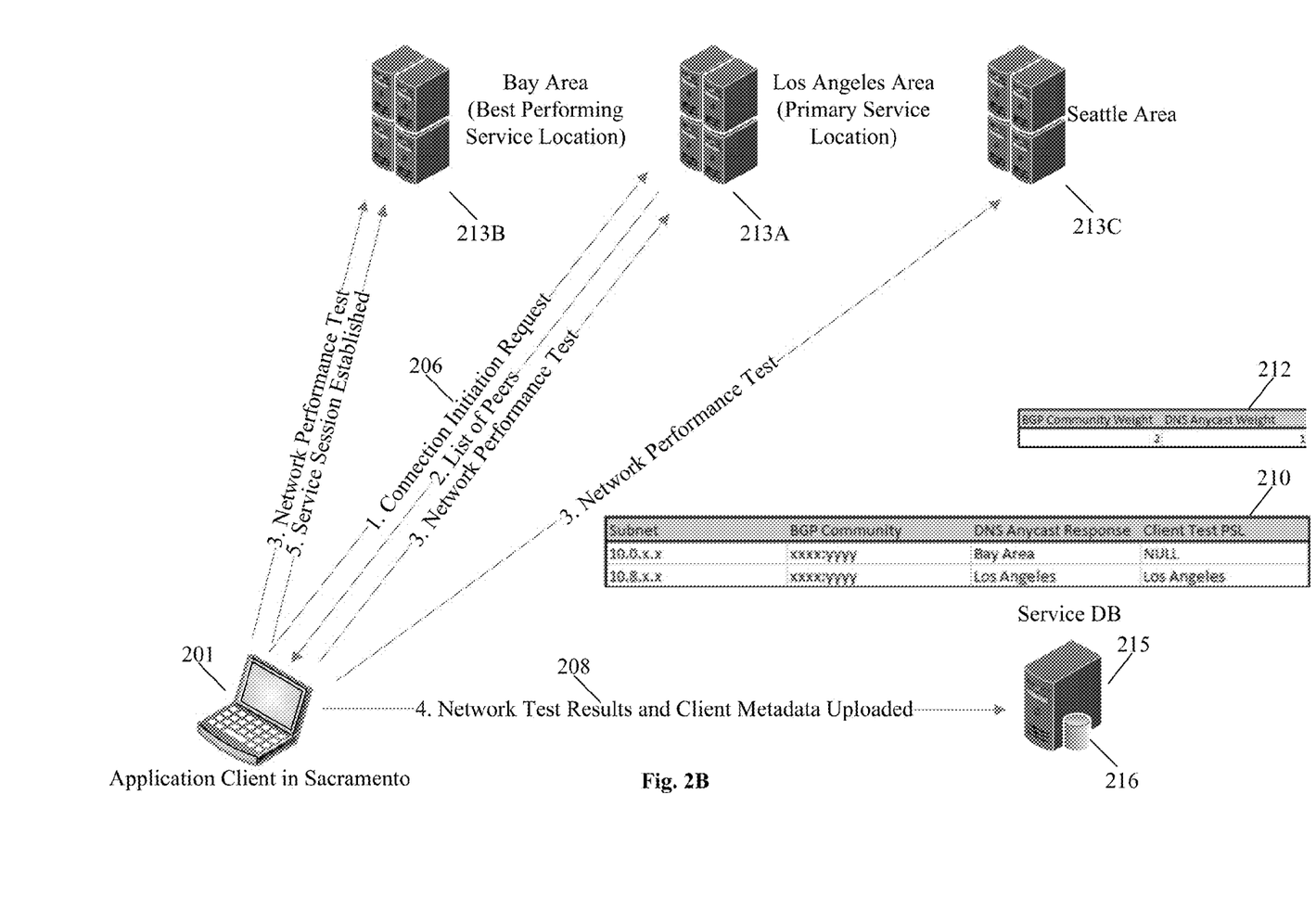

As shown in FIG. 2B, once client computing device 201 identifies PSL 213A as a candidate primary service location either through use of master location service 205 and geolocation database 207 or through anycast query 204 to lookup server 203, client computing device 201 may initiate a connection to PSL 213A through signaling mechanisms known to a person of ordinary skill in the art. In an embodiment, client computing device 201 in e.g., Sacramento, may transmit a connection initiation request 206 to PSL 213A in e.g., the Bay Area. Connection initiation request 206 may include a request for a list of service location peers. PSL 213A may return a list of service location peers geographically closest to PSL 213A, e.g., PSL 213B in the Los Angeles Area and PSL 213C in Seattle. PSL 213A may generate the list of service location peers from a lookup table or database stored on a memory device local or remote to PSL 213A. In some circumstances, PSL 213A, 213B, and 213C may include a lookup table or database that includes a list of primary service location peers.

Client computing device 201 may test performance of candidate PSL 213A as well as peer service locations 213B and 213C. In an embodiment, client computing device 201 may test performance of PSLs 213A, 213B, and 213C by, e.g., downloading a file or pulling a data stream having a certain size or other characteristics, from each of PSL 213A, 213B, and 213C. In an embodiment, client computing device 201 may run a video session from candidate PSL 213A and peer PSLs 213B and 213C using actual traffic. In some circumstances, a test file or test video may have characteristics similar to those of the service being provided by the candidate primary service location. For example, if the primary service location is to provide video streaming capabilities, a test video may have a particular size or other characteristics that aid in testing network performance.

Client computing device 201 may measure performance metrics or statistics, e.g., response time, memory use, packet loss (bursty or distributed), delay, latency, round trip times (RTT), jitter, error rates, throughput, availability, bandwidth, packet dropping probability, and the like, during the test. By doing so, client computing device 201 may determine which of candidate PSL 213A or peer PSLs 213B or 213C is the best performing primary service location based on the measured performance metrics or statistics based on the test.

Client computing device 201 may transmit performance metrics or statistics 208 to a service controller 215 for storage in a database 216. In an embodiment, client computing device 201 may transmit performance metrics or statistics 208 to service controller 215 including metadata of the client or primary service location, e.g., IP subnet address, BGP autonomous system number (ASN), BGP metadata, anycast DNS response, anycast PSL lookup service response, performance test timestamp, and the like. For example, a table 210 identifies a subnet address, BGP community, DNS anycast response, and client test PSL.

In some circumstances, client computing device 201 or service controller 215 may note an accuracy of the location resolution method utilized to identify candidate PSL 213A, e.g., whether computing client 201 identified candidate PSL 213A using master location device 205 and geolocation database 207, PSL anycast, DNS anycast, or the like. In an embodiment, service controller 215 may assign arbitrary numerical weights to the location resolution method for any segment in network 200. For example, service controller 215 may consider PSL anycast to be a more accurate location resolution method than DNS anycast, and thus assign PSL anycast a weight of, e.g., 3, that is higher than a weight, e.g., 1, it assigns to DNS anycast. For example, a table 212 weighs a BGP community resolution method as 2 and a DNS anycast resolution method as 1 since a BGP resolution method is more accurate relative to a DNS anycast resolution method. A person of ordinary skill in the art will recognize that other weighting methods and schemes come within the scope of the present disclosure.

In the event that client computing device 201 is unable to satisfactorily test the performance of candidate PSL 213A or peer PSLs 213B or 213C for any reason, client computing device 201 or service controller 215 may fall back to a broader scale network test against all sites in the region in an attempt to locate a suitable primary service location.

Figure 2C:
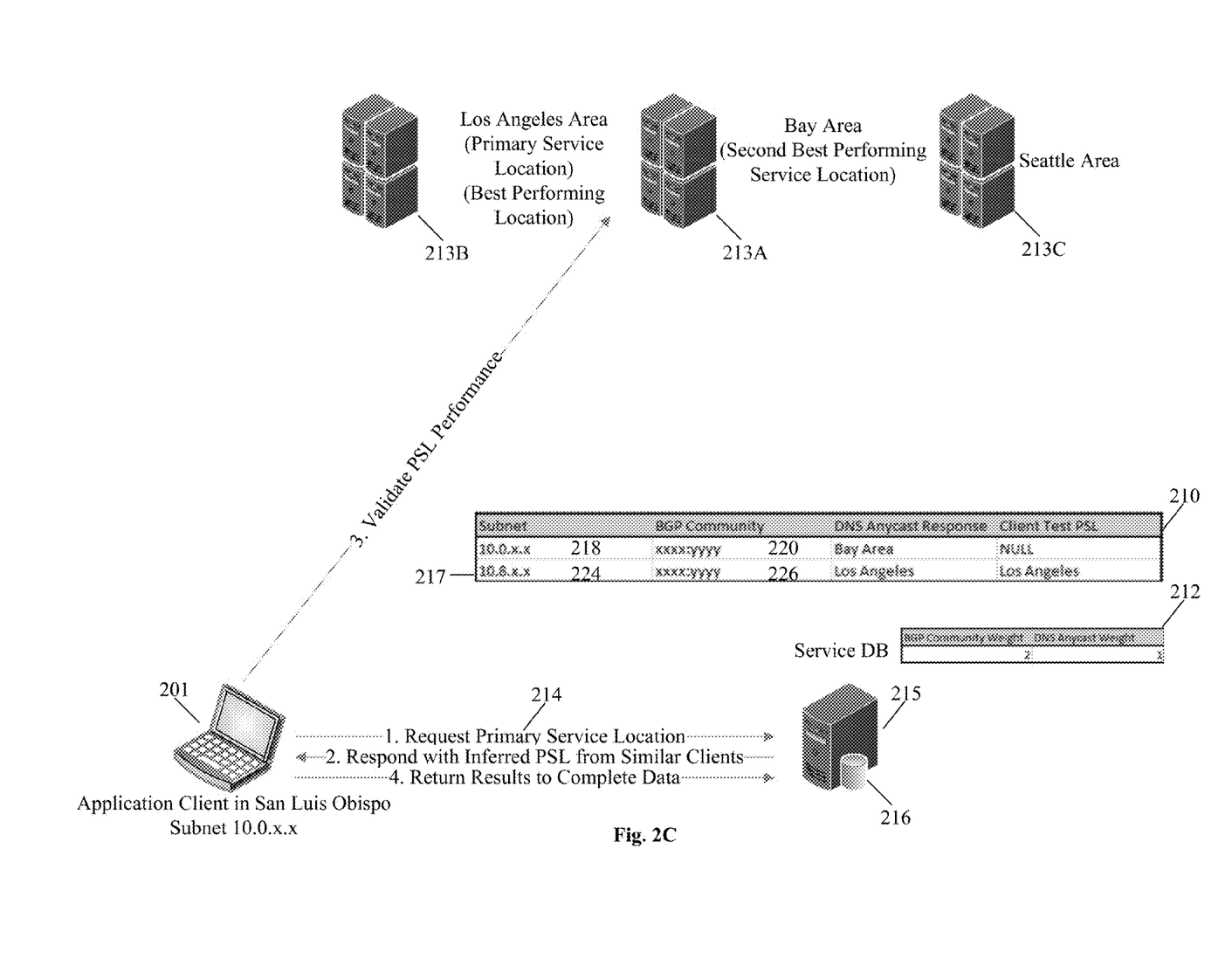

Referring to FIG. 2C, client computing device 201 may request a primary service location from service controller 215 that may, in turn, respond with a candidate primary service location inferred from other similar client computing devices. In an embodiment, client computing device 201 with a new subnet with a matching BGP community string may be routed to a primary service location identified by other clients in different subnets but with the same BGP metadata community string.

For example, client computing device 201 in San Luis Obispo may have a subnet address 218 of 10.0.x.x and a BGP community string 220 of XXX:yyyy that service controller 215 may look up in table 210. Service controller 215 may identify candidate PSL 213B in Los Angeles to client computing device 201 as being similar to a client 217 having a subnet address 224 of 10.8.x.x. and a BGP community string 226 of XXX:yyyy, which is identical to BGP community string 220 of client computing device 201.

Client computing device 201 may then connect to candidate PSL 213B by performing a test to validate its performance and return performance metrics or statistics from the performance test to the service controller 215 for updating database 216.

Figure 2D:
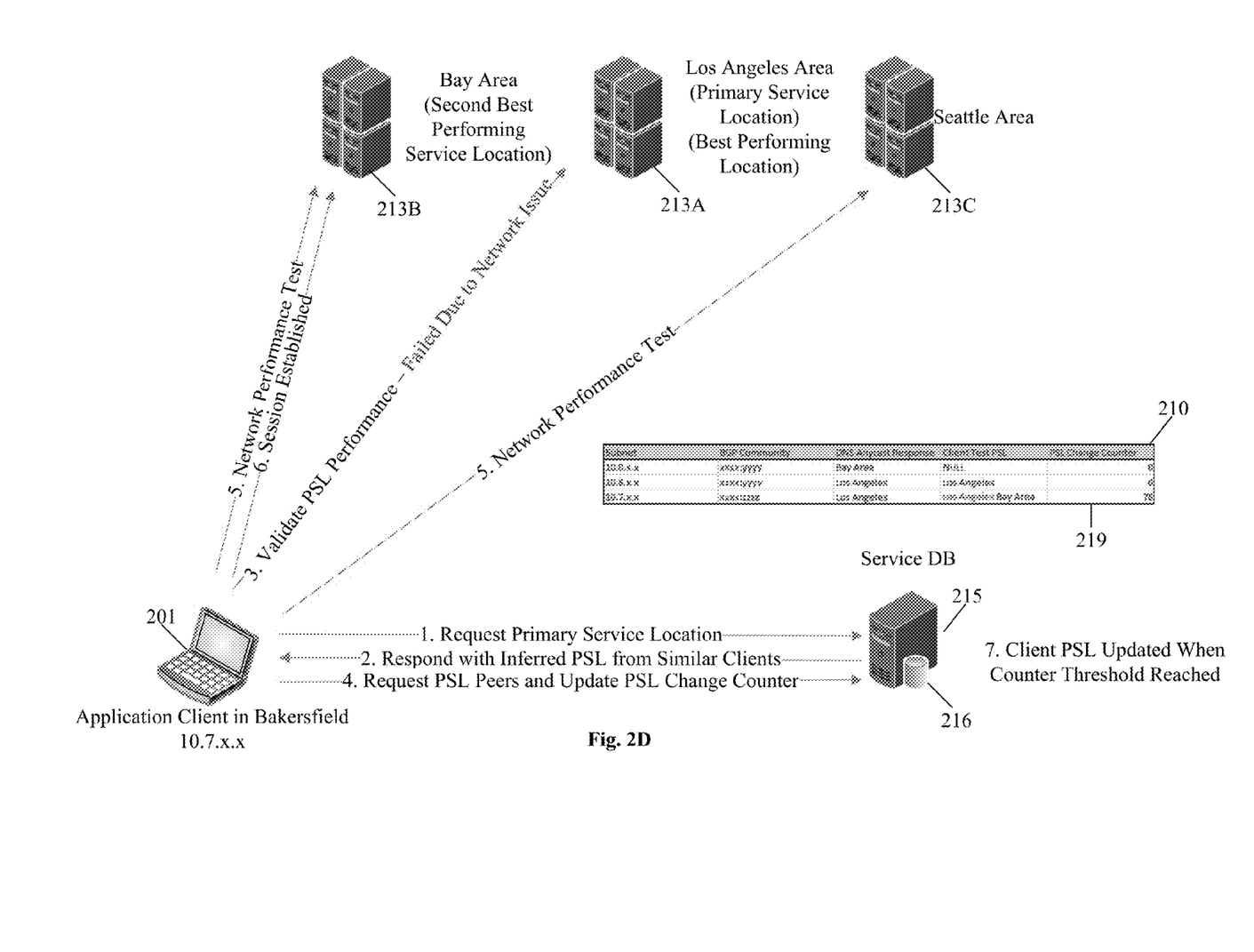

Referring to FIG. 2D, if client computing device 201 fails to validate a connection with PSL 213A for any reason including a network problem or issue, client computing device 201 may request a list of service location peers of candidate PSL 213A from service controller 215. Service controller 215, in turn, may update a PSL change counter 219 to indicate that client computing device 201 could not establish a connection with PSL 213A. Service controller 215 may identify service location peers, e.g., PSL 213B in the Bay Area and PSL 213C in Seattle, to client computing device 201 by looking them up in, e.g., table 210. Client computing device 201 may perform a test of peers PSL 213B and PSL 213C to establish a best performing primary service location from the two service location peers. For example, client computing device 201 may determine from performance metrics or statistics resulting from the performance test of peer PSLs 213B and 213C that PSL 213B in the Bay Area is the second best performing service location. Client computing device 201 may then establish a session with peer PSL 213B and may update service controller 215 with performance metrics or statistics resulting from the performance test of peer PSLs 213B and 213C.

In some circumstances, database 216 may include a record indicating that a primary service location is the best served from location for a group of client computing devices 201 behind the same network segment, but things like equipment failure, fiber cuts, and the like may change the best primary service location that is best to serve the network segment. In the event that performance tests indicate that a different primary service location is the best serve-from location for a client computing device 201 (or group of client computing devices 201 in a network segment), service controller 215 may increment PSL counter 219 in the database 216. Service controller 215 may change the primary service location when the PSL counter 219 reaches a threshold or a predetermined level. Once a threshold is reached, service controller 215 may start directing all client computing devices 201 from that network segment to a new primary service location.

As service controller 215 populates database 216 with performance metrics or statistics from tests performed by client computing devices 201 in network 200, the use of master location service 205 and geolocation database 207 to locate a candidate primary service location may diminish. And the number of client computing devices 201 in network 200 that are selected to perform tests against candidate and peer service locations may decrease as database 216 grows.

In an embodiment, service controller 215 may detect route performance changes or trends by analysis of performance metrics or statistics in database 216. In a circumstance where service controller 215 identifies a trend based on correlation with a subnet, it may instruct client computing devices 201 to execute a performance test to identify a new primary service location and route new requests accordingly after updating database 216.

Service location controller 215 may further comprise business rules that expand the decision criteria for identifying candidate and peer primary service locations. Telemetry gathered across different time or date values may alter identification of candidate and peer service locations. In an embodiment, service location controller 215 may determine congestion of particular regions at different times or date values and thus, identify candidate and peer service locations accordingly. Service location 215 may further assign weights based on business rules, such as cost to operate, such that a site that is the most effective from a network performance standpoint may not be identified as a candidate primary service location to client computing device 201 because another, perhaps a second best performing service location, has a lower operating cost and operating cost is weighed as higher consideration over network performance. Service controller 215 may apply business rules to direct client computing devices in network 200 to secondary or tertiary service locations that still meet network performance requirements, but that are more desirable due to lower operating costs, more available capacity, or the like.

Figure 2E:
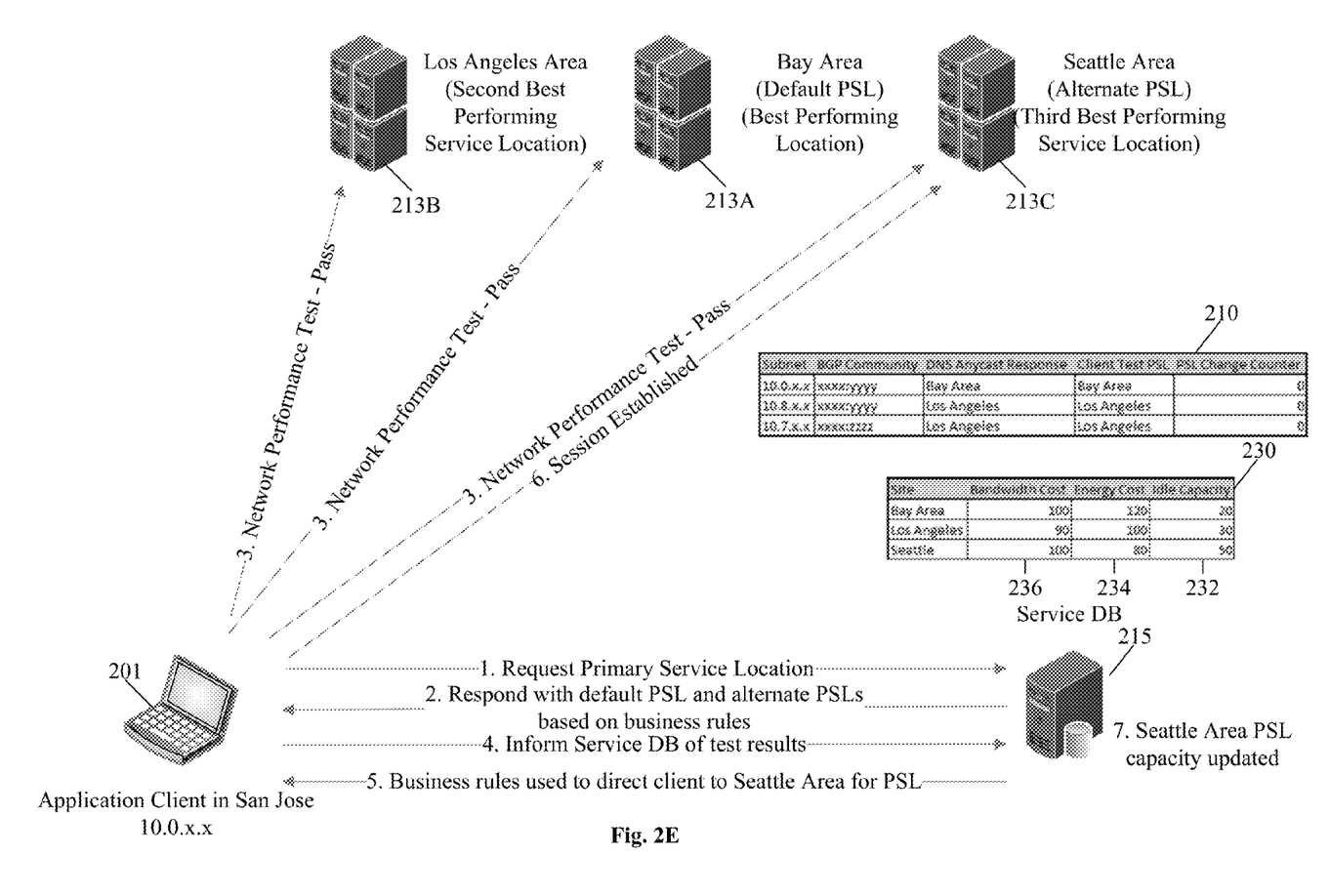

Referring to FIG. 2E, in an embodiment, service controller 215 may respond to a request 214 for a candidate service location from client computing device 201 by identifying a default primary service location and/or alternate primary service locations based on business rules table 230 stored in database 216. Business rule table 230 may include weights or scores used by service controller 215 to weigh certain characteristics of different primary service locations, e.g., bandwidth cost 232, energy cost 234, idle capacity 236, and the like. Service controller 215 may identify default PSL 213A as best performing, alternate PSL 213B as second best performing, and alternate PSL 213C as third best performing to client computing device 201 based on weights or scores stored in business rule table 230. Business rule table 230 may store the weight assigned to a particular business characteristic, a value for the business characteristic, a total reflecting a combination of both the weight and the value, or some combination. In an embodiment, service controller 215 may override the identification of a primary service location based on performance metrics with an identification of a primary service location based on business metrics such as those found in business rule table 230.

Client computing device 201 may test performance of PSLs 213A, 213B, and 213C, measure performance metrics or statistics, and inform service controller 215 of the test results for updating database 216. Service controller 215 may direct client computing device 201 to alternate PSL 213C in Seattle based on business rule table 230 even though alternate PSL 213C is the third best performing primary service location because it has the most idle capacity (or lowest energy cost). Client computing device 201 may establish a connection with PSL 213C. Service controller 215 may update table 230 by decreasing the idle capacity due to the new connection to client computing device 201.

Figure 3:
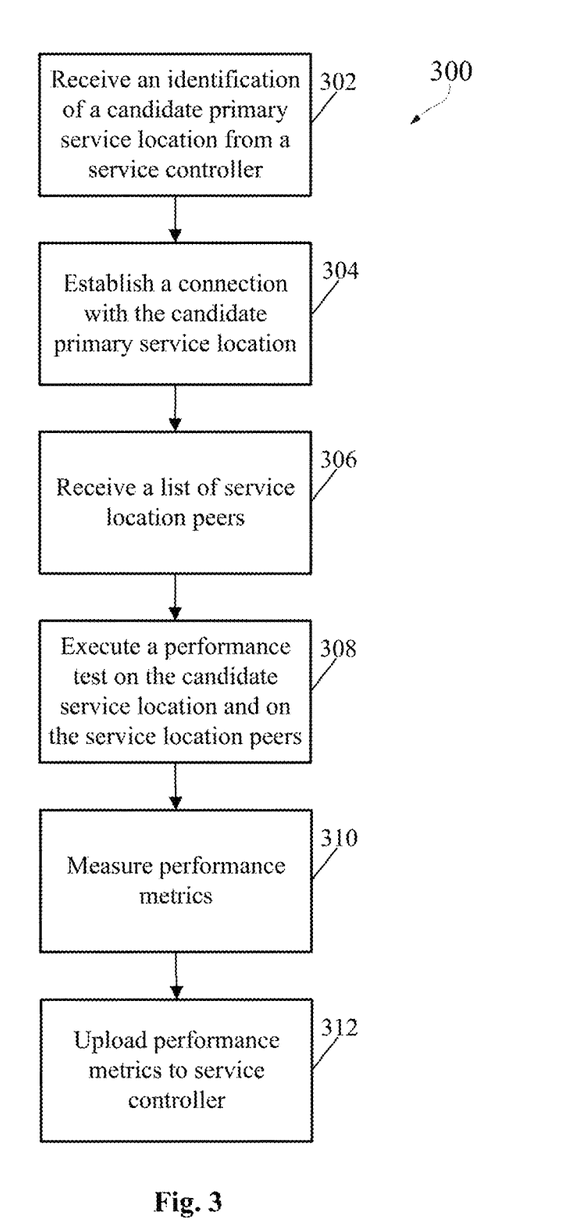
FIG. 3 diagrams an embodiment of a connection validation method from the perspective of a client according to the present disclosure.

FIG. 3 diagrams an embodiment of a connection validation method from the perspective of a client according to the present disclosure. Referring to FIGS. 1, 2A-D, and 3, at box 302, client computing device 201 may receive an identification of a candidate primary service location from a service controller. In an embodiment, client computing device 201 may receive the identification of the candidate primary service location in response to request 204, which may be anycast to lookup server 203 in some circumstances. At box 304, client computing device may establish a connection with the candidate primary service location. At box 306, client computing device may receive a list of peer service locations from the candidate service location. The candidate service location may provide a list of peer service locations in response to request 206 from the client computing device. At box 308, client computing device may execute a performance test on the candidate primary service location and peer service locations, e.g., download a file or pull a data stream. At box 310, client computing device may measure performance metrics, parameters, or statistics of the candidate primary service location or each of the peer service locations. At box 312, the client computing device uploads the measured performance metrics, parameters, or statistics to the service controller 215 and database 216.

Figure 4:
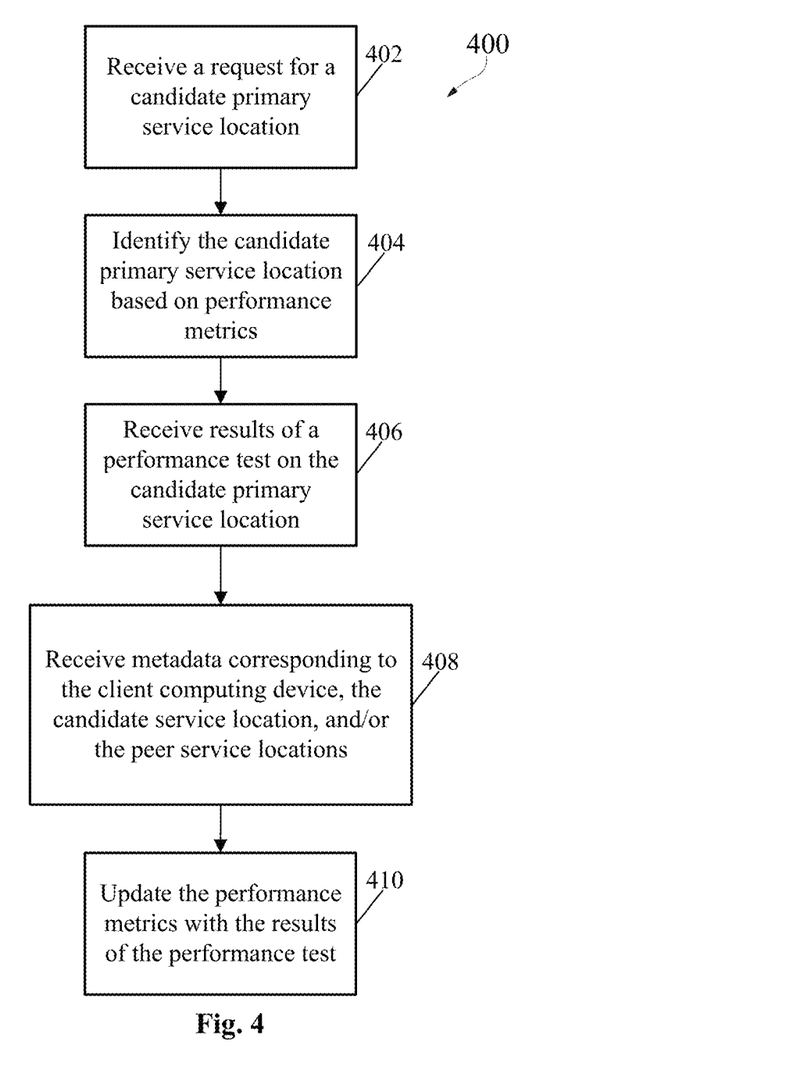
FIG. 4 diagrams an embodiment of a connection validation method from the perspective of a service controller according to the present disclosure.

FIG. 4 diagrams an embodiment of a connection validation method from the perspective of a service controller according to the present disclosure. Referring to FIGS. 1, 2A-D, and 4, at box 402, service controller 215 may receive request 204 for an identification of a candidate primary service location from a client computing device 201. At box, 404, service controller 215 identifies the candidate primary service location based on performance metrics. In an embodiment, service controller 215 may identify the candidate primary service location in database 216. At box 406, service controller 215 may receive results of a performance test initiated by client computing device 201 on the candidate primary service location (and any peer service locations identified to the client computing device). In an embodiment, service controller 215 may additionally receive metadata from the client computing device (box 408). At box 410, service controller 215 may update the performance metrics stored in database 216 with the performance metrics measured by the client computing device 201.

Figure 5:
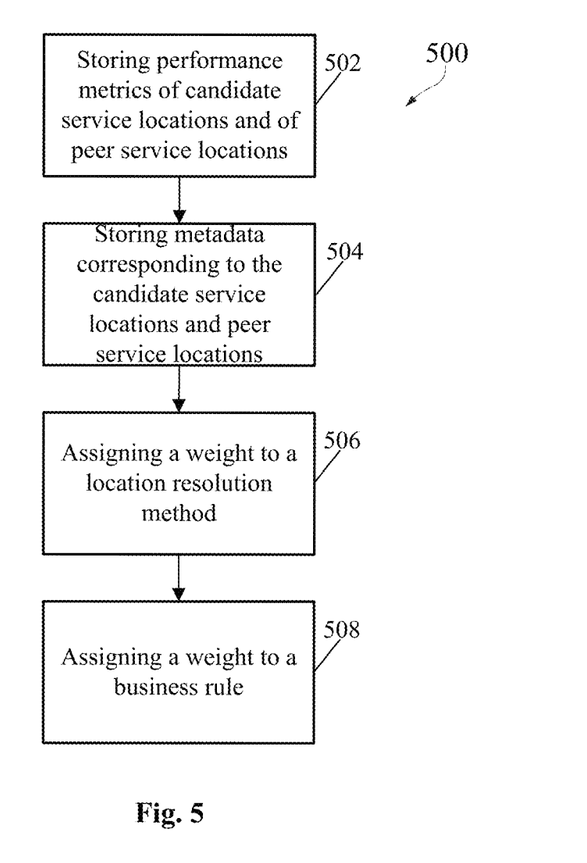
FIG. 5 diagrams an embodiment of a connection validation method from the perspective of a service controller according to the present disclosure.

FIG. 5 diagrams an embodiment of a connection validation method from the perspective of a service controller according to the present disclosure. Referring to FIGS. 1, 2A-D, and 5, at box 502, service controller 215 may store, in database 216, performance metrics, parameters, or statistics of candidate primary service locations and of peer service locations received from client computing devices 201. At box 504, service controller 215 may store, in database 216, metadata corresponding to the candidate primary service locations and peer service locations received from client computing devices 201. At box 506, service controller 215 may assign and store in database 216, a weight to a location resolution method or other metadata or performance metrics, parameters, or statistics received from client computing devices 201. At box 508, service controller 215 may assign and store in database 216, a weight to a business rule in database 216.

It will also be appreciated by persons of ordinary skill in the art that the present disclosure is not limited to what has been particularly shown and described hereinabove. Rather, the scope of the present disclosure includes both combinations and sub-combinations of the various features described hereinabove as well as modifications and variations which would occur to such skilled persons upon reading the foregoing description. Thus the disclosure is limited only by the appended claims.

The invention claimed is:

1. A system, comprising:
a processing unit comprising memory configured to store a database and one or more processors, the processing unit configure to:
transmit a connection initiation request to a primary service location to provide a service, the connection initiation request including a request for a list of service location peers;
receive a list of service location peers from the primary service location based, at least in part, on the request for the list of service location peers;
execute a performance test of the primary service location and each of the service location peers by downloading a file or pulling a data stream from the primary service location and each of the service location peers, wherein the file or the data stream include predetermined characteristics based, at least in part, on the service being provided by the primary service location;
identify a best performing service location based at least in part on the performance test; and
update the database with results of the performance test of the primary service location and each of the service location peers.

2. The system of claim 1,
wherein the processing unit is further configured to measure performance metrics during the performance test corresponding to the primary service location and each of the service location peers; and
wherein the processing unit is further configured to update the database with the performance metrics.

3. The system of claim 1, wherein the processing unit is further configured to upload metadata corresponding to the primary service location and each of the service location peers.

4. The system of claim 3, wherein the metadata comprises an IP subnet address, autonomous system number, border gateway protocol autonomous system number, border gateway protocol metadata, anycast domain name system response, anycast primary service location lookup service response, or performance test timestamp.

5. The system of claim 1, wherein the processing unit is further configured to identify the best performing service location based at least in part on business weights used to weigh business parameters of corresponding service locations.

6. A method, comprising:
transmitting a connection initiation request to a primary service location to provide a service, the connection initiation request including a request for a list of service location peers;
receiving a list of service location peers from the primary service location in response to the connection initiation request;
executing a performance test of the primary service location and each of the service location peers by downloading a file or pulling a data stream from the primary service location and each of the service location peers, wherein the file or the data stream include predetermined characteristics based, at least in part, on the service being provided by the primary service location;
identifying a best performing service location based at least in part on the performance test; and
updating a database with results of the performance test of the primary service location and each of the service location peers.

7. The method of claim 6, further comprising:
measuring performance metrics during the performance test corresponding to the primary service location and each of the service location peers; and
updating the database with the performance metrics.

8. The method of claim 6, further comprising:
uploading metadata corresponding to the primary service location and each of the service location peers to the database.

9. The method of claim 8, wherein the metadata comprises an IP subnet address, autonomous system number, border gateway protocol autonomous system number, border gateway protocol metadata, anycast domain name system response, anycast primary service location lookup service response, or performance test timestamp.

10. The method of claim 6, further comprising:
uploading an accuracy metric corresponding to identifying the primary service location.

11. A system, comprising:
a processing unit comprising memory configured to store a database and one or more processors, the processing unit configure to:
receive, from a client, a request for a primary service location to source content for the client;
identify, to the client, the primary service location and a plurality of service location peers from candidate primary service locations stored in the database in response to the request and based at least in part on performance parameters corresponding to each of the candidate primary service locations;
receive, from the client, test results corresponding to a performance test performed on a network connection between the client and the primary service location and each of the service location peers by downloading a file or pulling a data stream from the primary service location and each of a plurality of service location peers, wherein the file or the data stream include predetermined characteristics based, at least in part, on the service being provided by the primary service location; and
update the database with the test results.

12. The system of claim 11, wherein the database is configured to store:
test results corresponding to previous performance tests performed on network connections between serviced clients and the candidate primary service locations; and
metadata corresponding to the candidate primary service locations.

13. The system of claim 12, wherein the processing unit is further configured to determine the performance parameters corresponding to each of the candidate service locations based at least in part on the test results.

14. The system of claim 13, wherein the processing unit is further configured to identify the primary service location based at least in part on business weights used to weigh business parameters of corresponding service locations.

15. The system of claim 13, wherein the processing unit is further configured to identify the primary service location based at least in part on a portion of an address for the client.

16. The system of claim 13, wherein the processing unit is further configured to identify primary service location peers to the client in response to receiving a request for the primary service location peers.

17. The system of claim 13, wherein the processing unit is further configured to update the performance parameters corresponding to the primary service location in response to a failure of the primary service location.

18. The system of claim 13, wherein the processing unit is further configured to:
assign a location resolution weight to a location resolution method used to identify the primary service location; and
update the database with the location resolution weight.

* * * * *